P. A. EDDLEMAN.
VEHICLE HUB.
APPLICATION FILED MAR. 25, 1909.
955,060.
Patented Apr. 12, 1910.
2 SHEETS—SHEET 1.
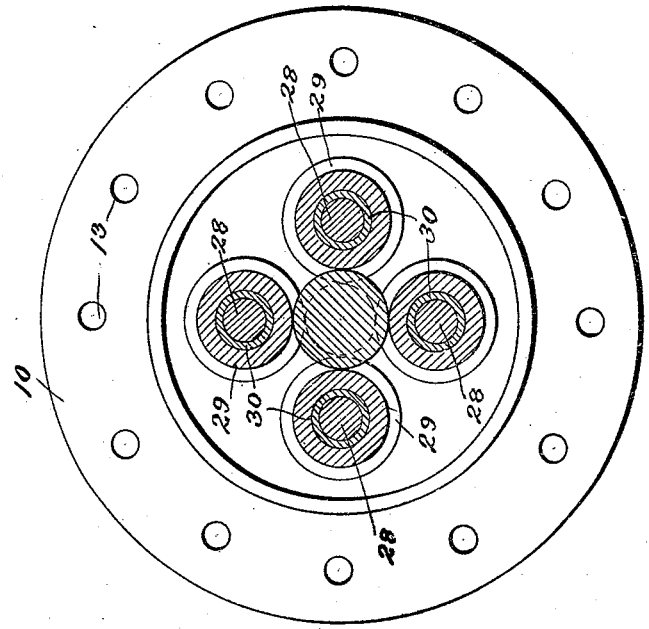
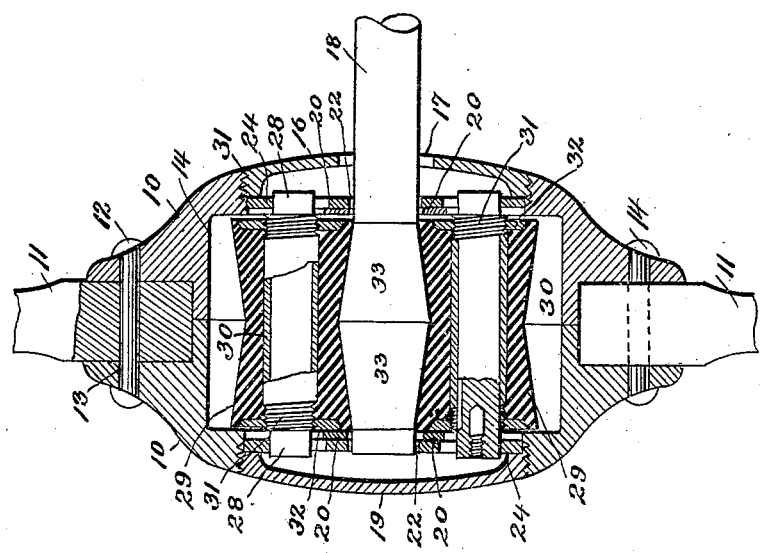
Witnesses
H. Strauss
S. L. Richmond
Inventor
Peter A. Eddleman,
By Mason Fenwick & Lawrence,
Attorneys

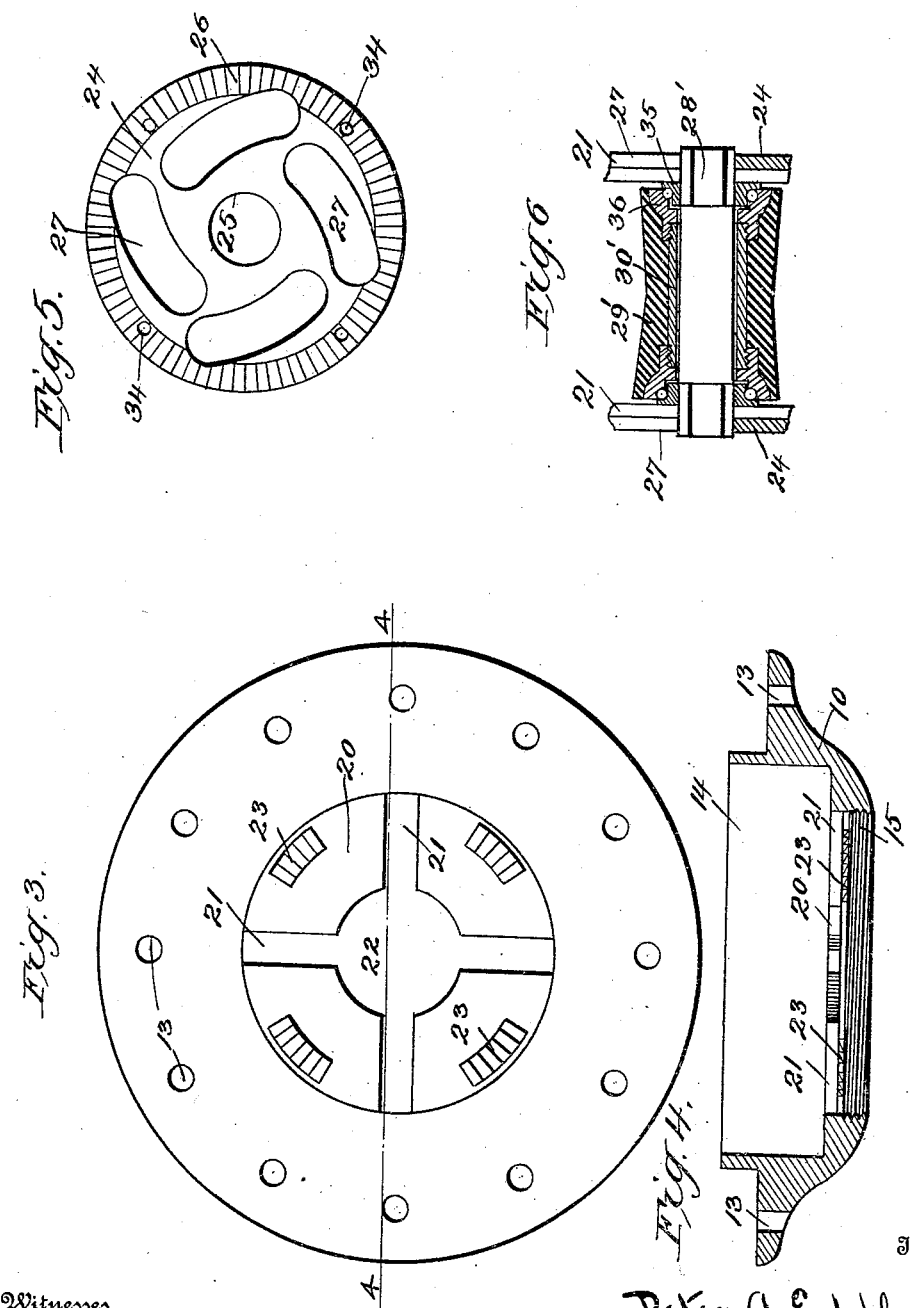

UNITED STATES PATENT OFFICE.

PETER A. EDDLEMAN, OF INGLESIDE, GEORGIA, ASSIGNOR OF ONE-HALF TO JAMES B. McCONNELL, OF INGLESIDE, GEORGIA.

VEHICLE-HUB.

955,060.  Specification of Letters Patent.  Patented Apr. 12, 1910.

Application filed March 25, 1909. Serial No. 485,676.

*To all whom it may concern:*

Be it known that I, PETER A. EDDLEMAN, a citizen of the United States, residing at Ingleside, in the county of Dekalb and State of Georgia, have invented certain new and useful Improvements in Vehicle-Hubs; and I do hereby declare the following to be a full, clear, and exact description of the invention, such as will enable others skilled in the art to which it appertains to make and use the same.

This invention relates to vehicle hubs and has for an object to provide a hub embodying resilient roller bearings of improved construction within the hub itself.

A further object of the invention is to provide a hub having improved means for regulating the position of the roller bearings relative to the axis of the hub.

With these and other objects in view the invention comprises certain novel constructions, combinations and arrangements of parts as will be described and claimed.

In the drawings, Figure 1 is a diametrical sectional view of the improved hub: Fig. 2 is a sectional view of the hub and associate parts taken at right angles to the axis: Fig. 3 is an exterior view of one side of the hub shown in elevation: Fig. 4 is a diametrical sectional view of the hub member shown at and taken on line 4—4 of Fig. 3: Fig. 5 is a view in elevation of one of the eccentrics: Fig. 6 is a longitudinal sectional view of a modified form of roller bearing.

Like characters of reference designate corresponding parts throughout the several views.

The hub which forms the subject matter of this application comprises two similar parts numbered 10, forming when secured together a circumferential channel for the reception of spokes 11, such spokes being maintained in position and the parts 10 secured rigidly together by means of rivets 12 inserted through openings 13.

Within the hub proper composed of the similar parts 10 a chamber 14 is provided having its opposite end openings screw threaded as at 15 shown in detail at Fig. 4, such openings being closed upon one side with a cap 16 having an opening 17 to receive an axle 18 and the other side being closed by a cap 19 similar to the cap 16 but without the axle opening.

Formed rigidly with the members 10 are webs 20 having diametrical slots 21 disposed perpendicularly to each other and having their centers communicating with a central opening 22 proportioned to accommodate the axle 18.

The webs 20 are provided with ratchet teeth 23 upon each of their exterior surfaces and in engagement therewith is an eccentric member 24 having a central opening 25 substantially corresponding in size and registering with the central openings 22 of the web 20 and for similar purposes to accommodate the axle 18. Each eccentric member 24 is provided on one side and extending to its periphery with ratchet teeth 26 positioned to engage with the ratchet teeth 23 of the members 10. Each eccentric member is also provided with a plurality of slots 27 disposed eccentrically to the opening 25 and a plurality of shafts 28 are journaled within the slots 21 and the eccentric slots 27. It will be apparent that by a rotation of the eccentric members 24 in either direction the bearing openings defined by a crossing of the slots 21 with eccentric slots 27 will be varied relative to the axle.

Upon the shafts 28 rollers 29 are carried, preferably composed of rubber or other yielding resilient material whereby resiliency is imparted to the wheel. As shown in the drawings a bushing 30 embraces the shafts 28 and is disposed between such shafts and the resilient rollers 29. To maintain the resilient material in position upon the bushings 30 the shafts 28 are screw threaded as at 31 adjacent their extremities and followers 32 are screwed upon the screw threads 31 and engage the ends of the resilient rollers 29 and the bushings 30.

The rollers 29 are preferably formed with faces inclined toward the center and in conjunction with such inclined faces the axle 18 is provided with reversely inclined faces 33.

It will be apparent that by the rotation of the eccentric member 24, which is accomplished by the insertion of a spanner in the openings 34, the rollers 29 may be separated to permit the insertion between such rollers of the reversely conical portions 33 of the axle after which the eccentric members may be rotated in the opposite direction to bring the rollers in the proper operative engagement with such axle. It will also be apparent that as the rollers 29 wear the eccentric members 24 may be rotated to adjust the rollers to compensate for such wear.

Instead of employing the rollers as shown at Figs. 1 and 2, a ball bearing roller may be employed wherein the shaft 28' is adapted to receive ball race cones 35 disposed in opposition to ball race cups 36 rigidly secured to the bushing 30'. Upon the roller consisting of the bushing 30' and the ball race cup 36 a resilient roller 29' is secured. Otherwise than providing the roller 29' with ball bearings the device as shown at Fig. 6 operates exactly as the rollers shown at Figs. 1 and 2.

What I claim is:

1. A hub with apertures formed therein to receive an axle and provided with teeth, a toothed eccentric member mounted within the hub with the teeth of the eccentric member engaging the teeth of the hub, and rollers mounted within the hub and the eccentric member.

2. A hub provided with central apertures formed therein to receive an axle, radial apertures formed in the hub to extend from the central opening, web members positioned between the radial apertures and carried by the hub and provided with teeth thereon, an eccentric member mounted upon each side of the hub and provided with teeth adapted to engage the teeth of the web members, and rollers mounted around the axle and having their ends positioned within the eccentric members.

3. A hub provided with axle receiving apertures and with a chamber, eccentric members mounted within the chamber, shafts journaled within the eccentric members, means to simultaneously vary the relation of the shafts to the axle, and resilient rollers carried by the shafts in engagement with the axle.

4. A hub provided with axle receiving apertures and with a chamber, shafts journaled within the walls of the chamber, means to simultaneously vary the relation of the shafts to the axle, and resilient rollers carried by the shafts in engagement with the axle.

5. A hub provided with axle receiving apertures, a chamber surrounding the axle, radial slots formed in the chamber wall, eccentric members disposed adjacent the chamber, shafts spanning the chamber and journaled in the eccentric members and in the radial slots formed in the chamber walls, and resilient rollers carried by the shaft within the chamber and adapted for engagement with the axle.

6. A hub provided with axle receiving apertures and with a chamber surrounding the axle and also with radial slots formed in the walls of the chamber, a member provided with eccentric slots mounted to register in part with the radial slots, and rollers journaled in the registering openings and positioned for engagement with the axle.

7. A hub provided with axle receiving apertures and with a chamber surrounding the axle and having radial slots formed in its walls, a member provided with eccentric slots mounted adjacent the radial slots and registering in part therewith, shafts journaled in the registering openings of the radial and eccentric slots and spanning the chamber, and resilient rollers carried by the slots in engagement with the axle.

8. A hub provided with axle receiving apertures and with a chamber surrounding the axle and having radial slots formed in its walls, ratchet teeth formed upon the exterior of the chamber walls, a member having eccentric slots disposed adjacent the exterior of the chamber walls and having ratchet teeth positioned to engage with the ratchet teeth of wall, shafts journaled in the registering openings of the radial and eccentric slots, and rollers carried by the shafts positioned for engagement with the axle.

9. A hub provided with axle receiving openings, an axle provided with a reversely inclined conical section, bearing plates positioned in the hub and being formed with radial slots, a plurality of rollers mounted within the bearing plates within the hub and having faces adapted to coöperate with the reverse conical portion of the axle, and means to adjust the position of the rollers relative to the axle.

10. A hub provided with axle receiving apertures and having teeth formed thereon, an axle disposed within the apertures and having a reversely inclined conical section within the hub, rollers disposed within the hub surrounding the axle and having reversely inclined faces adapted for coöperation with the reversely inclined conical portion of the axle, an eccentric member disposed on each side of the hub and provided with journal openings therein, and a system of teeth formed thereon to engage the teeth formed on the hub.

11. A hub having axle apertures formed therein and with a chamber surrounding the axle apertures and with radial slots formed in the chamber wall, an axle disposed within the hub and having reversely inclined conical sections disposed within the chamber, a member disposed adjacent the chamber wall and having eccentric slots in part registering with the radial slots of the chamber, rollers journaled in the registering openings of the radial and eccentric slots and provided with faces adapted for coöperation with the reversely inclined conical faces of the axle.

In testimony whereof I affix my signature in presence of two witnesses.

PETER A. EDDLEMAN.

Witnesses:
  V. S. MORGAN,
  C. S. MERCER.